US009091703B2

(12) United States Patent
Mulcaster

(10) Patent No.: US 9,091,703 B2
(45) Date of Patent: Jul. 28, 2015

(54) MEASUREMENT OF SHAFT SPEED, ANGULAR DISPLACEMENT, POSITION OR MOVEMENT

(75) Inventor: Jonathan James Mulcaster, Gloucestershire (GB)

(73) Assignee: Turner Powertrain Systems Limited, Wolverhampton (GB)

( * ) Notice: Subject to any disclaimer, the term of this patent is extended or adjusted under 35 U.S.C. 154(b) by 490 days.

(21) Appl. No.: 13/310,953

(22) Filed: Dec. 5, 2011

(65) Prior Publication Data
US 2012/0146629 A1    Jun. 14, 2012

(30) Foreign Application Priority Data

Dec. 9, 2010    (EP) ..................................... 10194367

(51) Int. Cl.
| G01B 7/30 | (2006.01) |
| G01P 3/487 | (2006.01) |
| G03G 5/00 | (2006.01) |
| B63H 1/00 | (2006.01) |
| G01D 5/14 | (2006.01) |
| G01D 5/245 | (2006.01) |

(52) U.S. Cl.
CPC *G01P 3/487* (2013.01); *B63H 1/00* (2013.01); *G01D 5/145* (2013.01); *G01D 5/2451* (2013.01); *G03G 5/00* (2013.01); *G03G 2215/00* (2013.01)

(58) Field of Classification Search
CPC ....... B63H 1/00; G03G 5/00; G03G 2215/00; G03G 2217/00
USPC ............... 73/514.16, 514.31, 514.33, 514.39; 324/207.25, 173–174
See application file for complete search history.

(56) References Cited

U.S. PATENT DOCUMENTS

| 3,281,825 | A | * | 10/1966 | Sanders et al. ................... 341/15 |
| 4,377,333 | A | * | 3/1983 | Tsuji et al. ....................... 399/18 |
| 4,450,403 | A | | 5/1984 | Dreiseitl et al. |
| 4,533,902 | A | * | 8/1985 | Baker et al. ........................ 341/9 |
| 4,791,727 | A | * | 12/1988 | Hojo et al. ....................... 33/325 |
| 5,393,201 | A | * | 2/1995 | Okutani et al. ................. 417/16 |
| 5,426,978 | A | | 6/1995 | Imai |
| 5,979,248 | A | * | 11/1999 | Gloger ........................ 73/862.28 |
| 5,979,249 | A | | 11/1999 | Koo et al. |
| 6,252,394 | B1 | * | 6/2001 | Roze et al. ............... 324/207.12 |
| 7,157,906 | B2 | * | 1/2007 | Miya ......................... 324/207.25 |
| 7,215,113 | B2 | * | 5/2007 | Kinoshita ................. 324/207.24 |
| 7,579,827 | B2 | * | 8/2009 | Burns et al. .................... 324/173 |
| 2003/0085697 | A1 | * | 5/2003 | Dobbs et al. ................... 324/173 |
| 2005/0073299 | A1 | * | 4/2005 | Yoshikawa et al. ...... 324/207.25 |
| 2005/0259377 | A1 | | 11/2005 | Gullich |

FOREIGN PATENT DOCUMENTS

EP    0412780 A2    2/1991

* cited by examiner

*Primary Examiner* — Huy Q Phan
*Assistant Examiner* — Temilade S Rhodes-Vivour
(74) *Attorney, Agent, or Firm* — Liell & McNeil Attorneys, PC

(57) ABSTRACT

The disclosure relates to improvements in the measurement of shaft speed. The shaft has an end face and at least one detection mark provided on or in the end face of the shaft to enable the speed, angular displacement, position or movement of the shaft to be detected. The shaft is for use in a shaft assembly comprising a sensor positioned at a distance from the shaft end face. The sensor is configured to measure the speed, angular displacement, position or movement of the shaft by sensing movement of the detection marks.

8 Claims, 4 Drawing Sheets

MEASUREMENT OF SHAFT SPEED, ANGULAR DISPLACEMENT, POSITION OR MOVEMENT

RELATION TO OTHER PATENT APPLICATION

This application claims priority to European Patent Application No. 10194367.8, filed Dec. 9, 2010 with the same title.

TECHNICAL FIELD

The disclosure relates to improvements in the measurement of shaft speed, angular displacement, position or movement.

BACKGROUND

It is well known to measure the rotational position and the speed of rotation of shafts, and in particular that of a transmission shaft. This is often achieved through the use of a speed sensing arrangement.

U.S. Pat. No. 7,579,827 describes a speed sensing arrangement for sensing the speed of a transmission input shaft, which includes circumferentially spaced markings about the shaft and a speed sensor that is placed in close proximity to the markings The markings may be incorporated on a target wheel (also know as a speed sensor disc), which is attached to the input shaft. In one embodiment of the target wheel a gear ring is provided with a plurality of teeth that define the circumferentially spaced markings.

Speed sensor discs, such as the target wheel referred to above, are typically made from pressed steel plate, with serrations at the edge. The serrations allow the speed sensor to detect rotational movement of the shaft and thus determine how fast the transmission shaft is rotating. Pressed steel plate is generally used for the speed sensor disc in order to keep costs down. In order to fit the speed sensor disc amongst the other components on the transmission shaft, additional componentry, such as a thrust washer, is usually needed. Thrust washers are typically made from better quality steel than the speed sensor disc and are machined to provide a good surface finish. The thrust washer is required since the surface finish of the speed sensor disc is poor and this could potentially damage critical neighboring components on the shaft. It is also common practice to use a standard washer and bolt on the end of the shaft to ensure that the speed sensor disc is firmly held in place. Thus, such prior art speed sensing arrangements require four separate components to be mounted on the transmission shaft. This means that the shaft needs to be sufficiently long to provide space for the components to be mounted.

Furthermore these prior art speed sensors are mounted for radial measurement which means that the assembly must be configured to accommodate the speed sensor.

SUMMARY

The disclosure provides a shaft having an end face and at least one detection mark provided on or in the end face of the shaft to enable the speed, angular displacement, position or movement of the shaft to be detected.

The disclosure also provides a shaft assembly including a sensing arrangement comprising a shaft having an end face and at least one detection mark provided on or in the end face of the shaft and a sensor positioned at a distance from the shaft end face, said sensor being configured to measure the speed, angular displacement, position or movement of the shaft by sensing movement or the position of the detection marks.

BRIEF DESCRIPTION OF THE DRAWINGS

An embodiment of an improved shaft for a shaft assembly including a sensing arrangement will now be described, by way of example only, with reference to the accompanying drawings in which.

DETAILED DESCRIPTION

Figure 1:
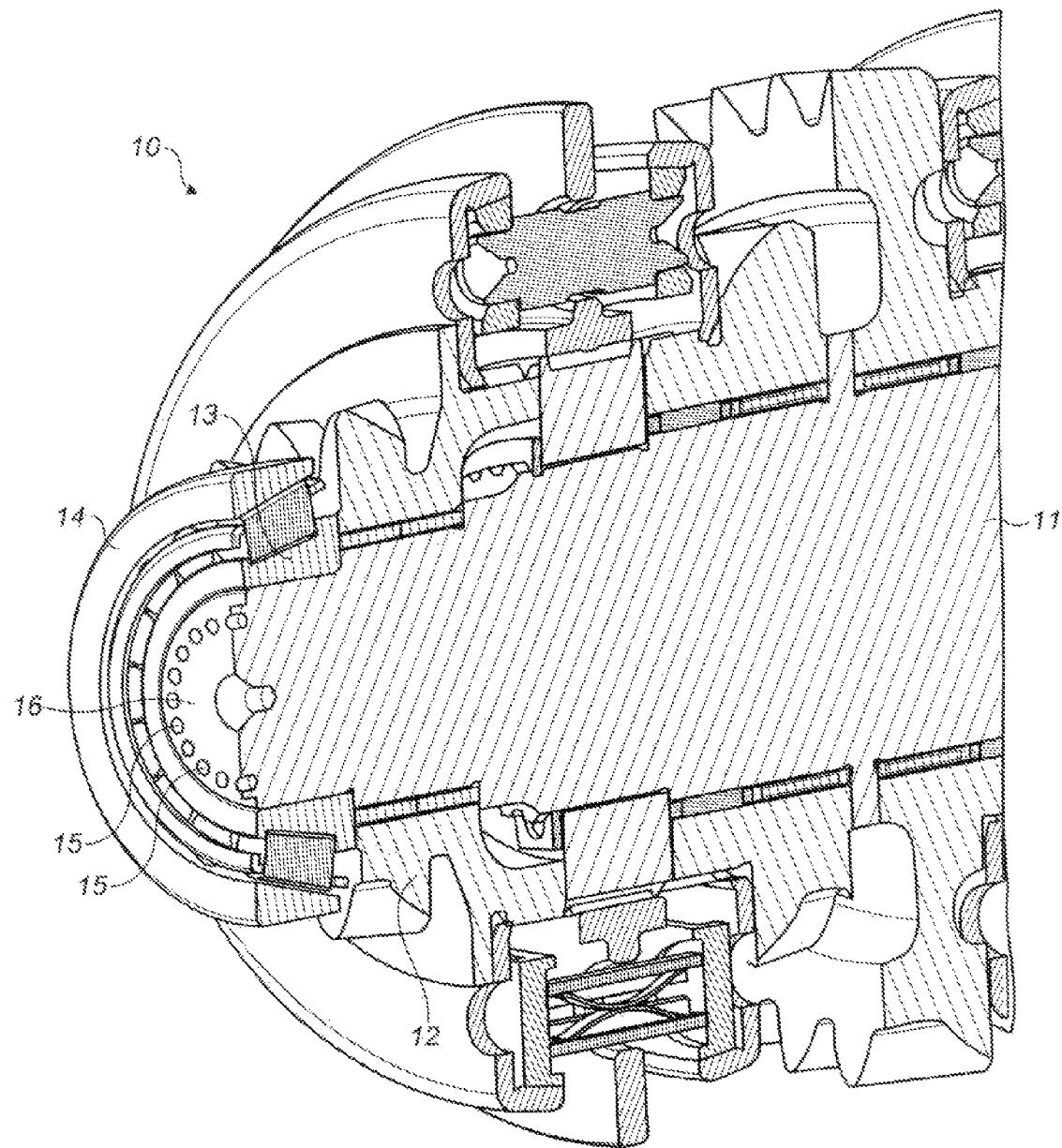
FIG. 1 is a cross-section of an improved shaft assembly including detection marks according to the present disclosure.

The shaft assembly 10 illustrated in the Figures generally comprises a transmission shaft 11 and a sensor 17 located for measuring one or all of the shaft speed, angular displacement, position or movement from an axial perspective. Mounted at one end of the shaft 11 is a gear 12. The gear 12 is held in position, for example, by the cone 13 of a taper roller bearing 14.

At least one detection mark 15 is provided in or on an end face 16 of the shaft 11. In one embodiment the shaft 11 has a plurality of spaced apart detection marks 15. The detection marks 15 may be machined into the end face 16 or formed in another manner and can, for example, be projections, indents, splines, serrations, holes or markings The detection marks 15 may be offset from the axis of the shaft 11, evenly spaced in a ring around the axis or formed in another pattern which is suitable for detection by the sensor 17. In one embodiment there are at least twelve detection marks 15, each having a minimum width of 3 mm. The width of the gap between adjacent detection marks 15 may be substantially the same as the width of the detection marks 15. For indexing purposes one of the detection marks 15 may be omitted from an otherwise regular pattern.

Figure 2:
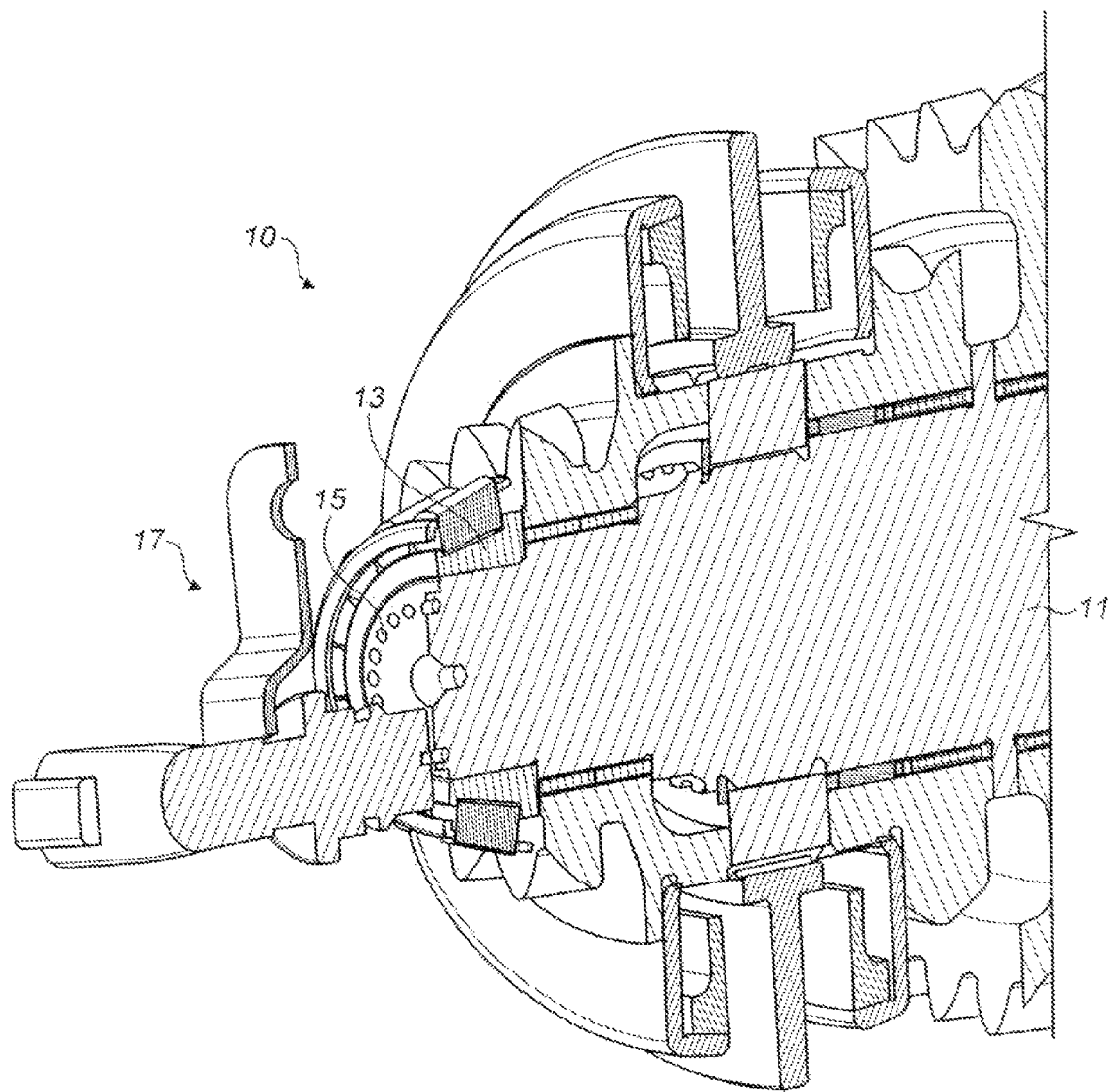
FIG. 2 is a similar view to that of FIG. 1 showing the position of the sensor relative to the shaft.
Figure 3:
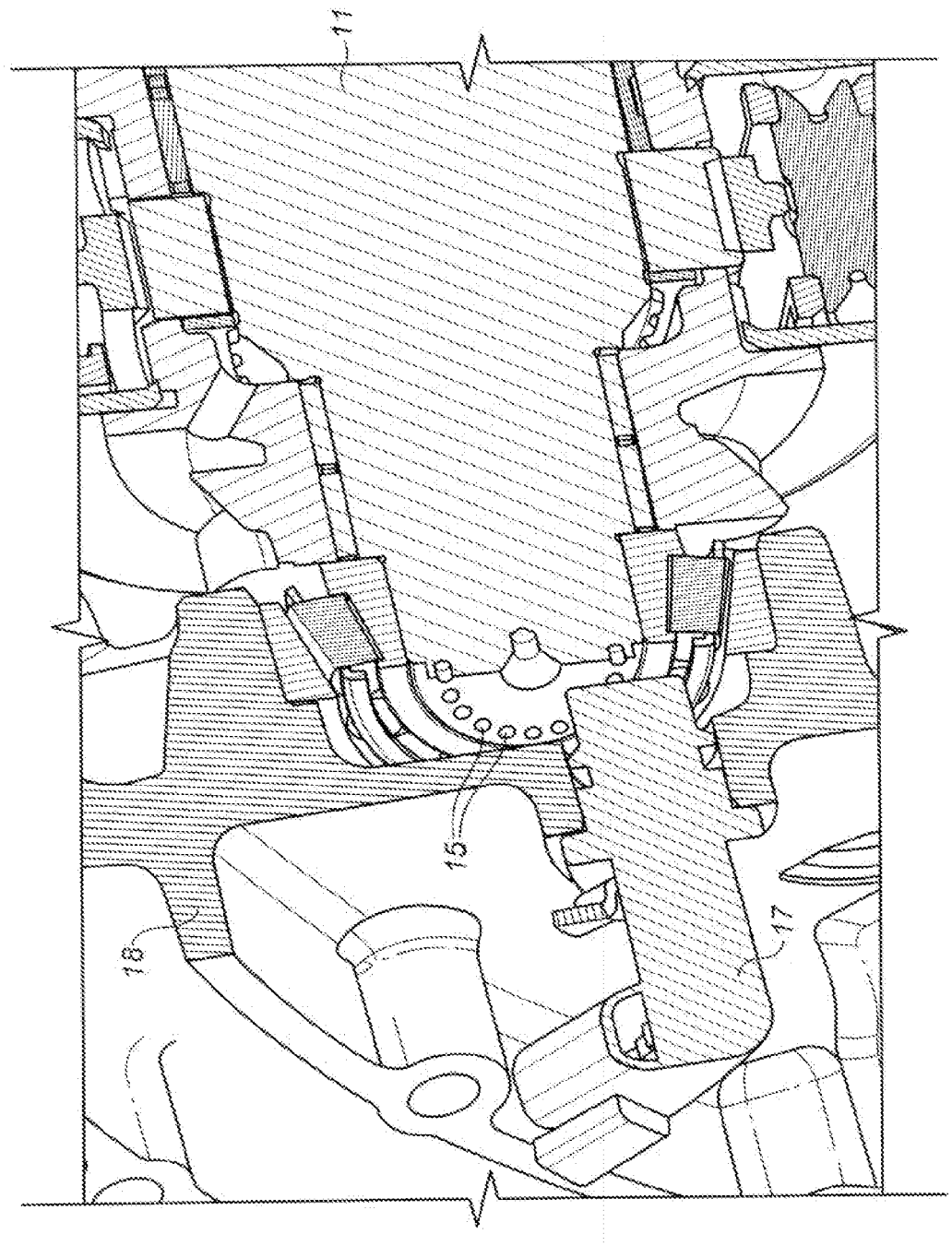
FIGS. 3 and 4 are cross sections through the shaft assembly of FIG. 1 from different orientations showing the sensor mounted to the transmission casing.
Figure 4:
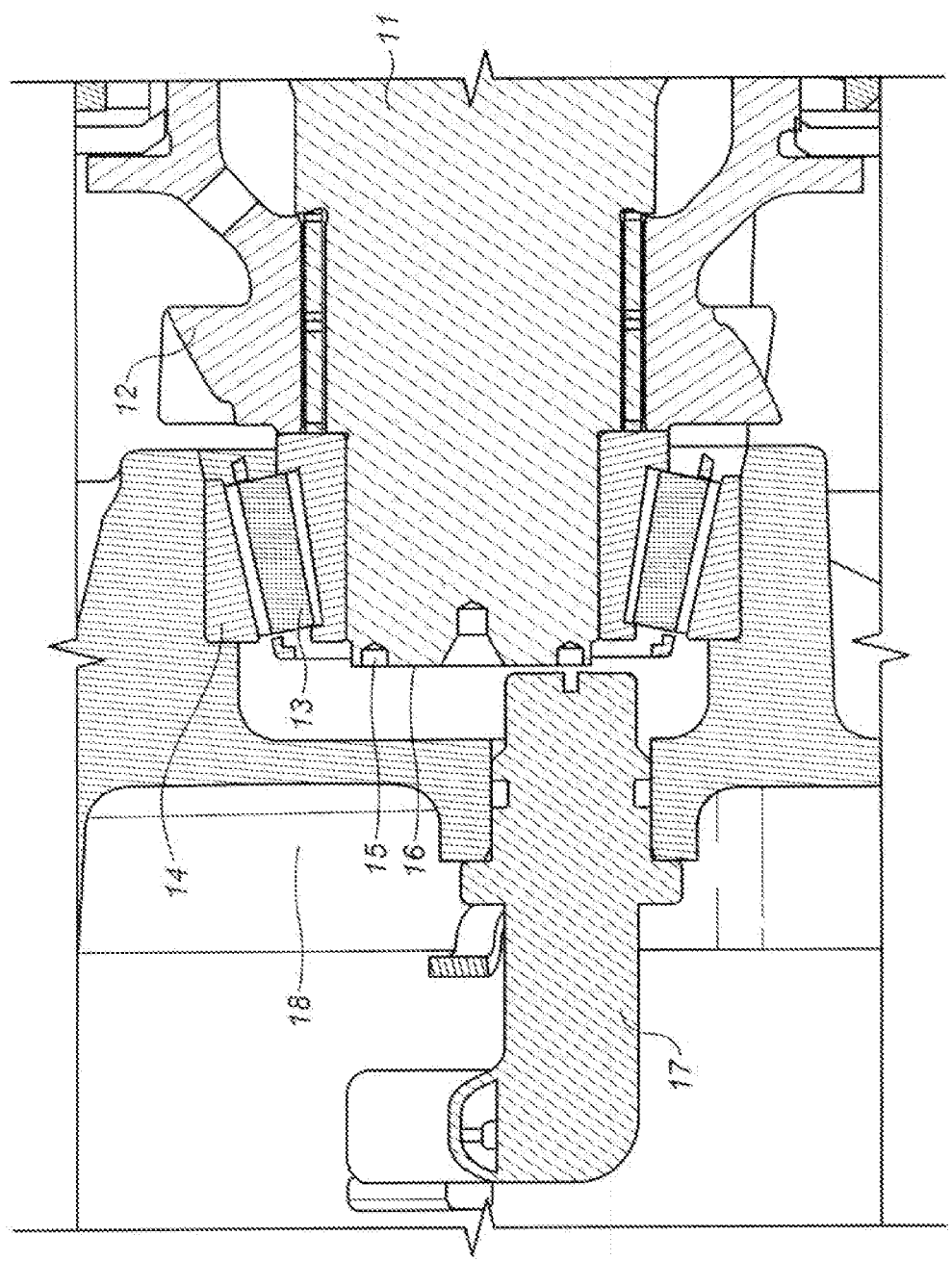

The sensor 17 is located in a plane axially displaced from the end face 16 at a position whereby the rotation of the detection marks 15 can be detected by the sensor 17. In one embodiment the sensor 17 may be mounted to an external part of a casing 18, such as a transmission casing housing the shaft 11. One suitable position is illustrated in FIGS. 2 to 4 in which the sensor 17 is located axially in line with the shaft 11. However other mounting positions are acceptable, such as offset from or at an angle to the axis of the shaft 11, as long the rotation of the detection marks 15 can be detected by the sensor 17.

In one embodiment the sensor 17 is mounted with a minimum air gap (i.e. the gap between the end of the shaft 11 and the sensor 17) of 0.5 mm. A typical maximum gap is 1.5 mm, but this may depend on the application and the type of sensor 17 used.

The sensor 17 may be a passive sensor, such as a magnetic sensor which does not require a power source. Examples of suitable sensors include variable reluctance sensors, magnetic pick up sensors, pulse generators, timing probes and crankshaft position sensors. A variable reluctance sensor usually comprises a permanent magnet, a ferromagnetic pole piece and a pick up coil. As the detection marks 15 pass by the face of the magnet, the magnetic flux passing through the magnet, and therefore the coil, varies. The moving detection marks 15 provide a time varying flux that induces a proportional voltage in the coil.

INDUSTRIAL APPLICABILITY

The aforementioned shaft 11 and shaft assembly 10 can be used for a variety of applications, including transmissions, gearboxes, transfer boxes, internal and external combustion engines and the like.

One suitable application is for measurement of the speed of the output shaft in a vehicle transmission, which converts the output of the vehicle engine to rotational movement to drive the vehicle wheels to propel the vehicle. The vehicle transmission typically includes a gearbox, clutch and various drive shafts. In operation as the shaft 11 is driven to rotate, the detection marks 15 rotate past the sensor 17. The movement of the detection marks 15 causes the sensor 17 to generate an output signal proportional to the speed of rotation of the shaft 11.

What is claimed is:

1. A shaft assembly comprising:
    a casing;
    a shaft mounted for rotation about an axis in the casing and supported at one end by a bearing;
    a gear mounted at the one end of the shaft;
    an end face of the shaft including a plurality of detection marks machined into the end face and evenly spaced in a ring shaped pattern around the axis;
    a sensor attached to the casing and located in a plane axially displaced by an air gap from the end face away from the shaft, and being oriented to detect rotation of the detection marks around the axis; and
    the sensor being operable to generate a signal proportional to a rotational speed of the shaft.

2. The shaft assembly of claim 1 wherein the sensor is a magnetic sensor; and
    a magnetic flux in the sensor varies as each of the detection marks pass by the sensor due to rotation of the shaft.

3. The shaft assembly of claim 2 wherein the air gap is between a half millimeter and one and one half millimeters.

4. The shaft assembly of claim 3 wherein each of the detection marks is a hole that opens through the end face of the shaft; and
    a distance between adjacent detection marks is substantially the same as a width of one of the detection marks.

5. The shaft assembly of claim 4 wherein a pattern of the detection marks in the ring includes a detectable index provided by omission of a detection mark from an otherwise regular pattern.

6. The shaft assembly of claim 5 wherein the sensor is oriented offset from, but axially aligned with, the axis.

7. The shaft assembly of claim 6 wherein the shaft is a transmission shaft that converts output from a vehicle engine to rotational movement to propel the vehicle.

8. The shaft assembly of claim 7 wherein the pattern of detection marks includes at least twelve detection marks.

* * * * *